US012691821B2

(12) United States Patent
Haynes

(10) Patent No.: US 12,691,821 B2
(45) Date of Patent: Jul. 28, 2026

(54) SAFETY MIRROR ASSEMBLY

(71) Applicant: Maggi Haynes, Hermitage, TN (US)

(72) Inventor: Maggi Haynes, Hermitage, TN (US)

( * ) Notice: Subject to any disclaimer, the term of this patent is extended or adjusted under 35 U.S.C. 154(b) by 409 days.

(21) Appl. No.: 18/218,900

(22) Filed: Jul. 6, 2023

(65) Prior Publication Data

US 2025/0010795 A1    Jan. 9, 2025

(51) Int. Cl.
| | |
|---|---|
| *B60R 1/00* | (2022.01) |
| *B60Q 1/26* | (2006.01) |
| *B60Q 1/52* | (2006.01) |
| *B60Q 5/00* | (2006.01) |
| *B60R 1/12* | (2006.01) |
| *B60R 11/00* | (2006.01) |

(52) U.S. Cl.
CPC ............ *B60R 1/006* (2013.01); *B60Q 1/2661* (2013.01); *B60Q 1/52* (2013.01); *B60Q 5/001* (2013.01); *B60R 1/12* (2013.01); *B60R 2001/1276* (2013.01); *B60R 2011/0028* (2013.01)

(58) Field of Classification Search
CPC ......... B60R 1/007; B60R 1/008; B60R 1/006; B60R 1/12; B60R 2001/1276; B60R 2011/0028; B60Q 1/52; B60Q 1/2661

USPC ......................................................... 296/1.04
See application file for complete search history.

(56) References Cited

U.S. PATENT DOCUMENTS

| | | | | |
|---|---|---|---|---|
| 4,681,366 | A * | 7/1987 | Lobanoff | ............... B60N 2/879 297/410 |
| 4,703,972 | A | 11/1987 | Omberg | |
| 4,824,159 | A | 4/1989 | Fluharty | |
| 5,576,898 | A * | 11/1996 | Rubin | ..................... B60R 1/008 359/872 |
| 6,710,710 | B1 | 3/2004 | Wang | |
| 8,434,812 | B2 * | 5/2013 | Li | ........................... B60R 1/082 296/97.5 |
| 8,779,914 | B2 | 7/2014 | Ros Santasusana | |
| 9,931,984 | B2 | 4/2018 | West | |
| D848,931 | S | 5/2019 | Yang | |
| 2008/0297930 | A1 | 12/2008 | Santasusana | |
| 2010/0277821 | A1 * | 11/2010 | Roth | ......................... B60R 1/04 359/872 |
| 2017/0008381 | A1 * | 1/2017 | Huelke | .................. B60J 3/0282 |
| 2022/0194186 | A1 * | 6/2022 | Jiang | ..................... B60J 3/0282 |

* cited by examiner

*Primary Examiner* — Steven O Douglas

(57) ABSTRACT

A safety mirror assembly for viewing behind oneself when placing items in a vehicle includes the vehicle, which has a plurality of doors for accessing an interior of the vehicle. A visor is mounted in a rear portion of the vehicle adjacent to one of the plurality of doors. A reflective material is mounted to the visor, and the visor is orientable such that a user may view behind the user via the reflective material when placing items in the interior of the vehicle near the adjacent door.

10 Claims, 6 Drawing Sheets

SAFETY MIRROR ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to vehicle mounted mirrors and more particularly pertains to a new vehicle mounted mirror for viewing behind oneself when placing items in the vehicle.

(2) Description of Related Art Including Information Disclosed Under 37 CFR 1.97 and 1.98

The prior art describes myriad mirrors which are mounted in a rear portion of a vehicle. Many of these devices are positioned such that they are advantageous for usage as a vanity mirror or to identify a position of another automobile near the vehicle. But the prior art fails to disclose such an apparatus which is mounted adjacent to a door and is orientable so that a user standing near the adjacent door is able to view behind the user when placing items in the vehicle. Such an apparatus would allow the user to identify approaching assailants and provide the user with the opportunity to timely flee from the assailant or call attention to the assailant's presence.

(h) BRIEF SUMMARY OF THE INVENTION

An embodiment of the disclosure meets the needs presented above by generally comprising a vehicle with a plurality of doors for accessing an interior of the vehicle. A visor is mounted in a rear portion of the vehicle and is positioned on an interior surface of the vehicle adjacent to one of the plurality of doors. The visor has a first end and a second end. The visor has a first edge and a second edge each extending between the first end and the second end. The visor also has a first surface and a second surface each extending between the first end and the second end and between the first edge and the second edge. The visor is orientable such that the first surface faces an opening to the interior of the vehicle which is covered by the adjacent door when the adjacent door is closed. A reflective material is coupled to the first surface of the visor and is configured to reflect light which strikes the reflective material. The reflective material is configured to facilitate a user positioned outside the vehicle proximate the adjacent door to view behind the user via the reflective material when the first surface of the visor faces the opening.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
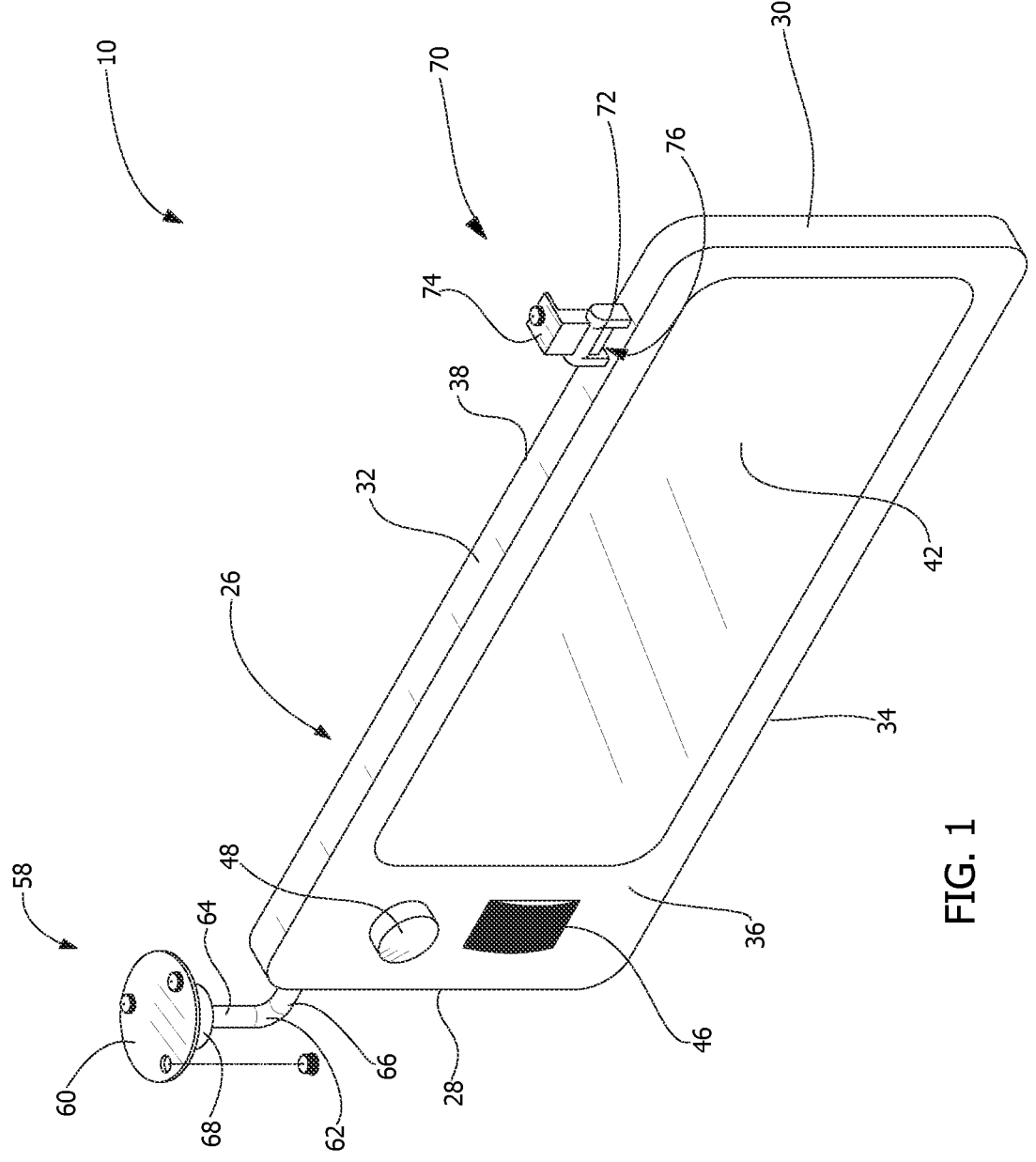
FIG. 1 is a top perspective view of a safety mirror assembly according to an embodiment of the disclosure.
Figure 2:
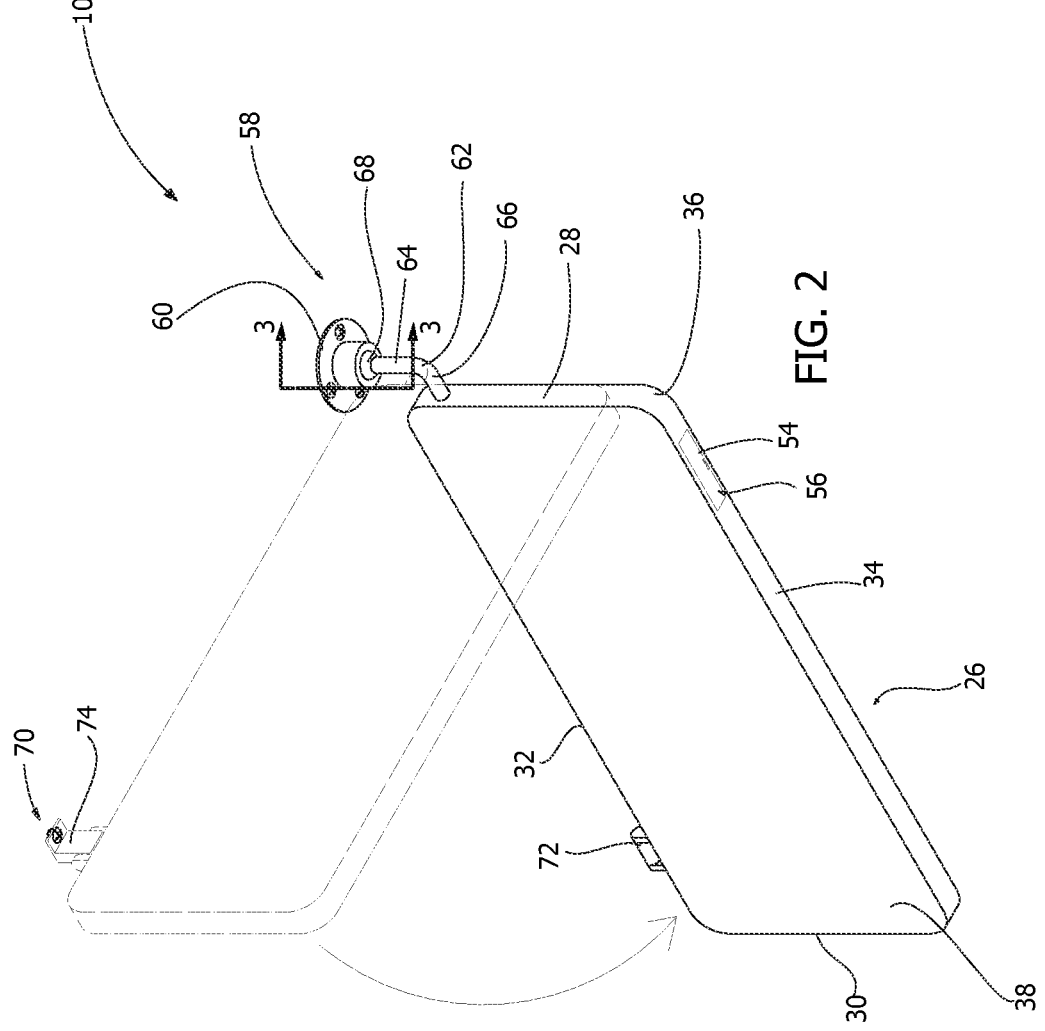
FIG. 2 is a bottom perspective view of an embodiment of the disclosure.
Figure 3:
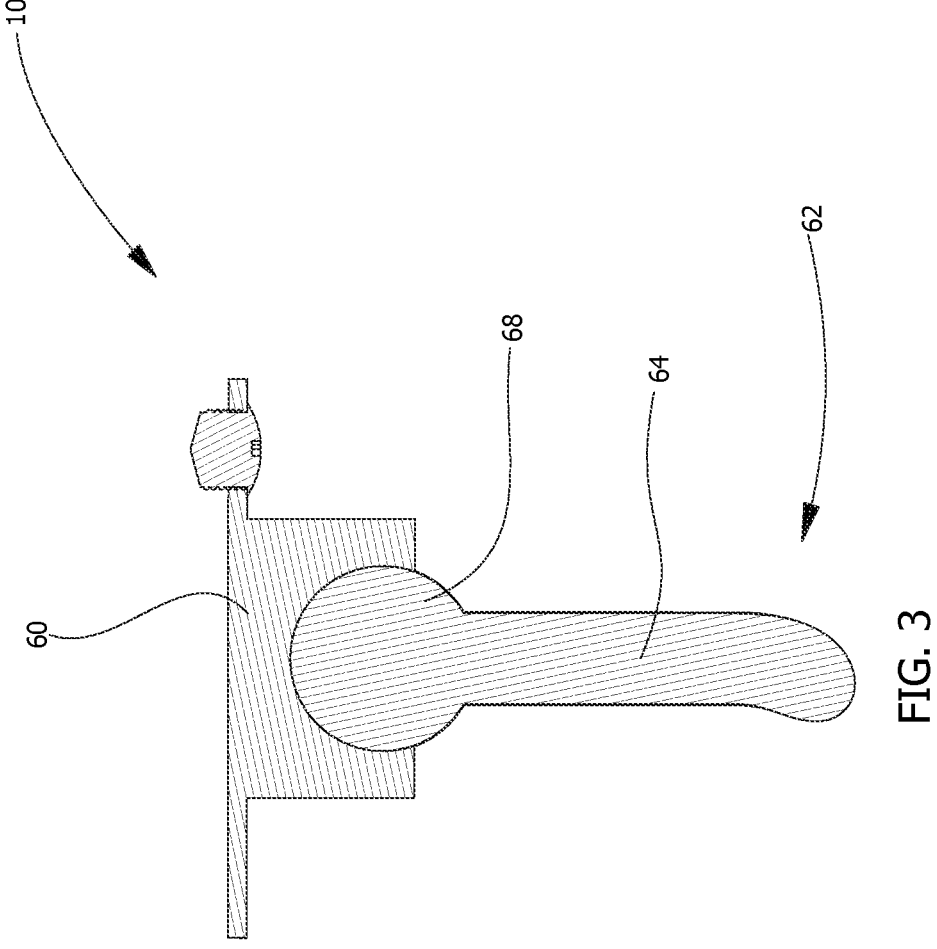
FIG. 3 is a cross-section view of an embodiment of the disclosure taken from Arrows 3-3 in FIG. 2.
Figures 4, 5:
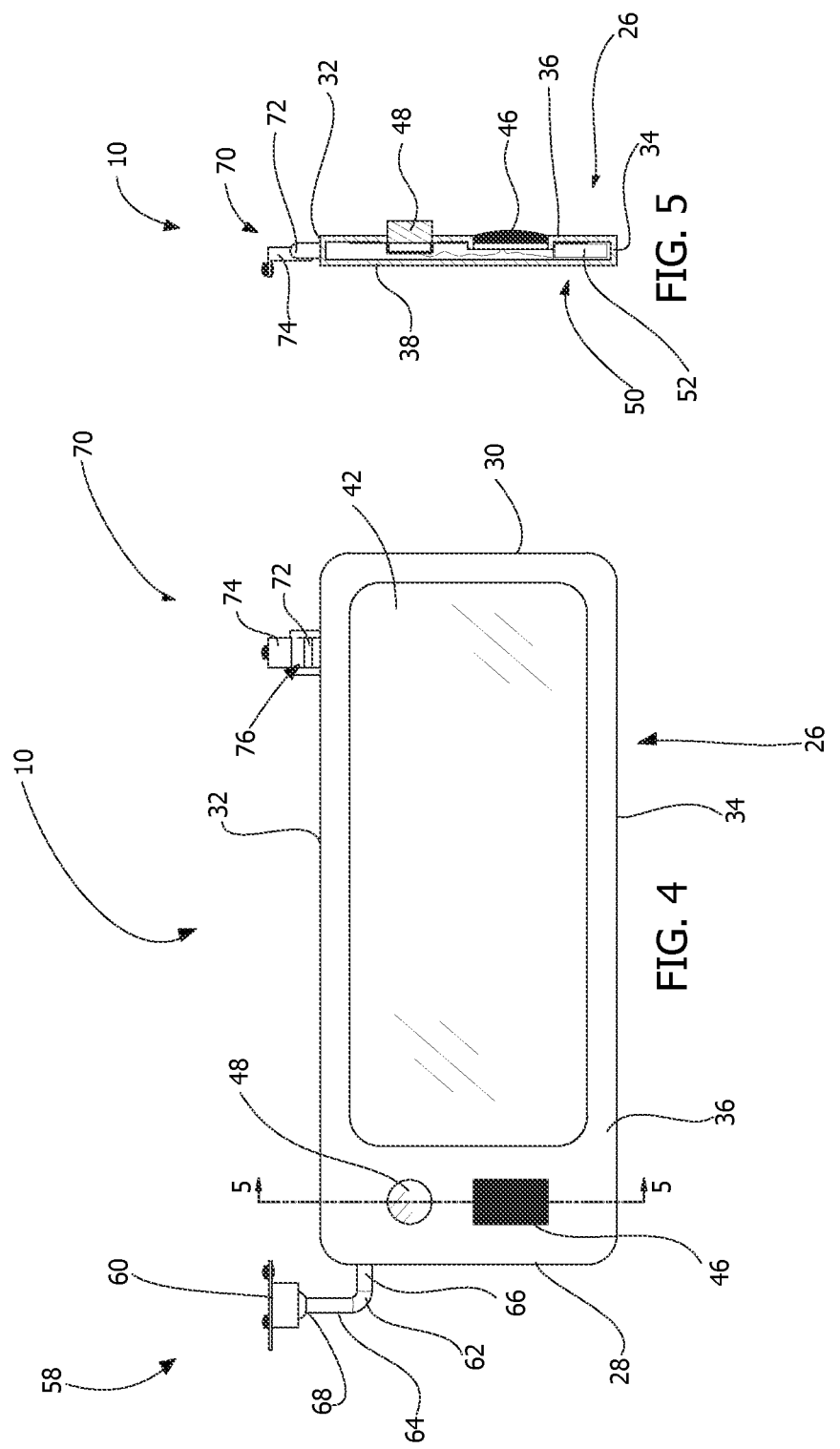
FIG. 4 is a front view of an embodiment of the disclosure.
FIG. 5 is a cross-section view of an embodiment of the disclosure taken from Arrows 5-5 in FIG. 4.
Figure 6:
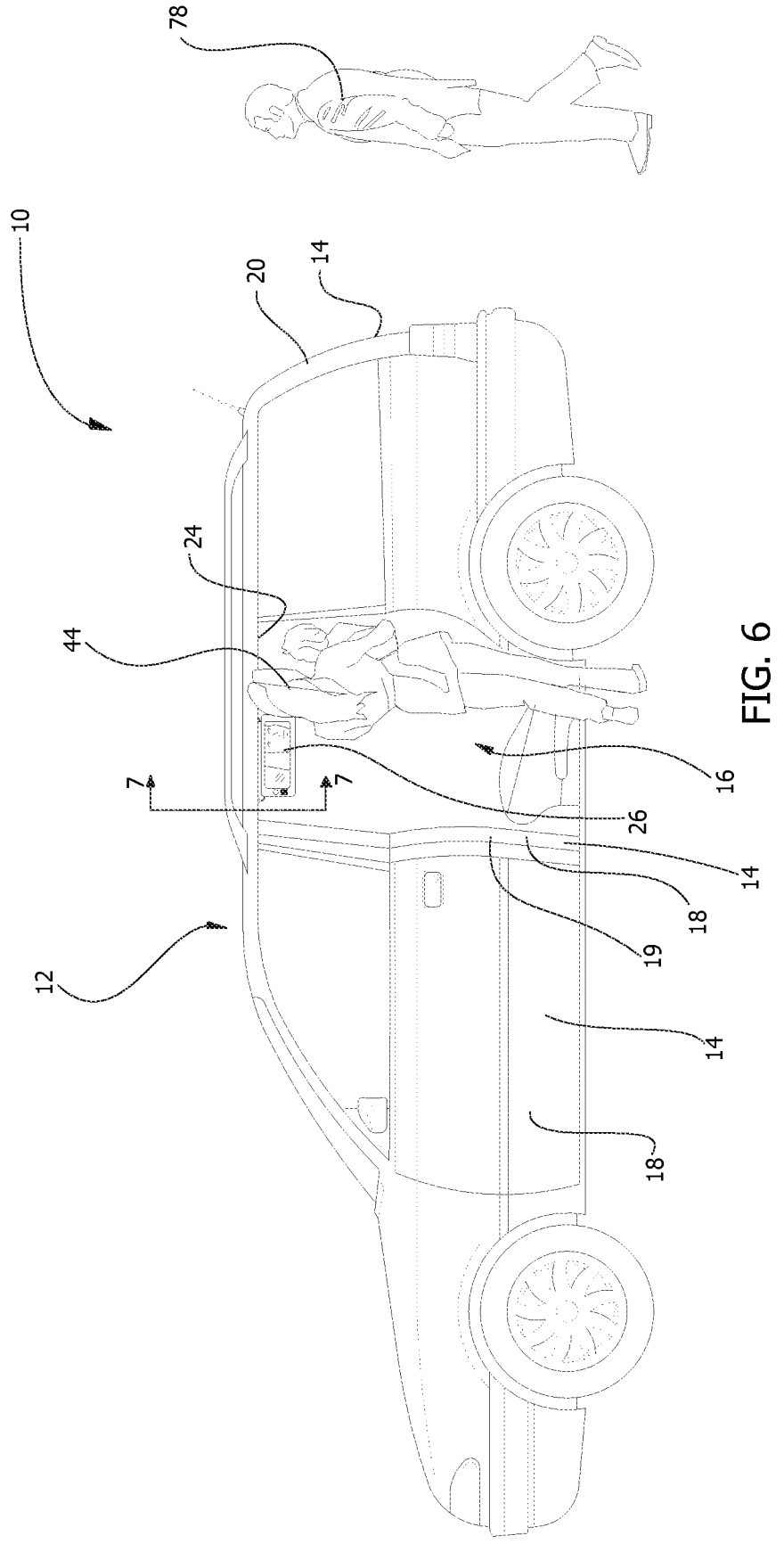
FIG. 6 is an in-use view of an embodiment of the disclosure.
Figure 7:
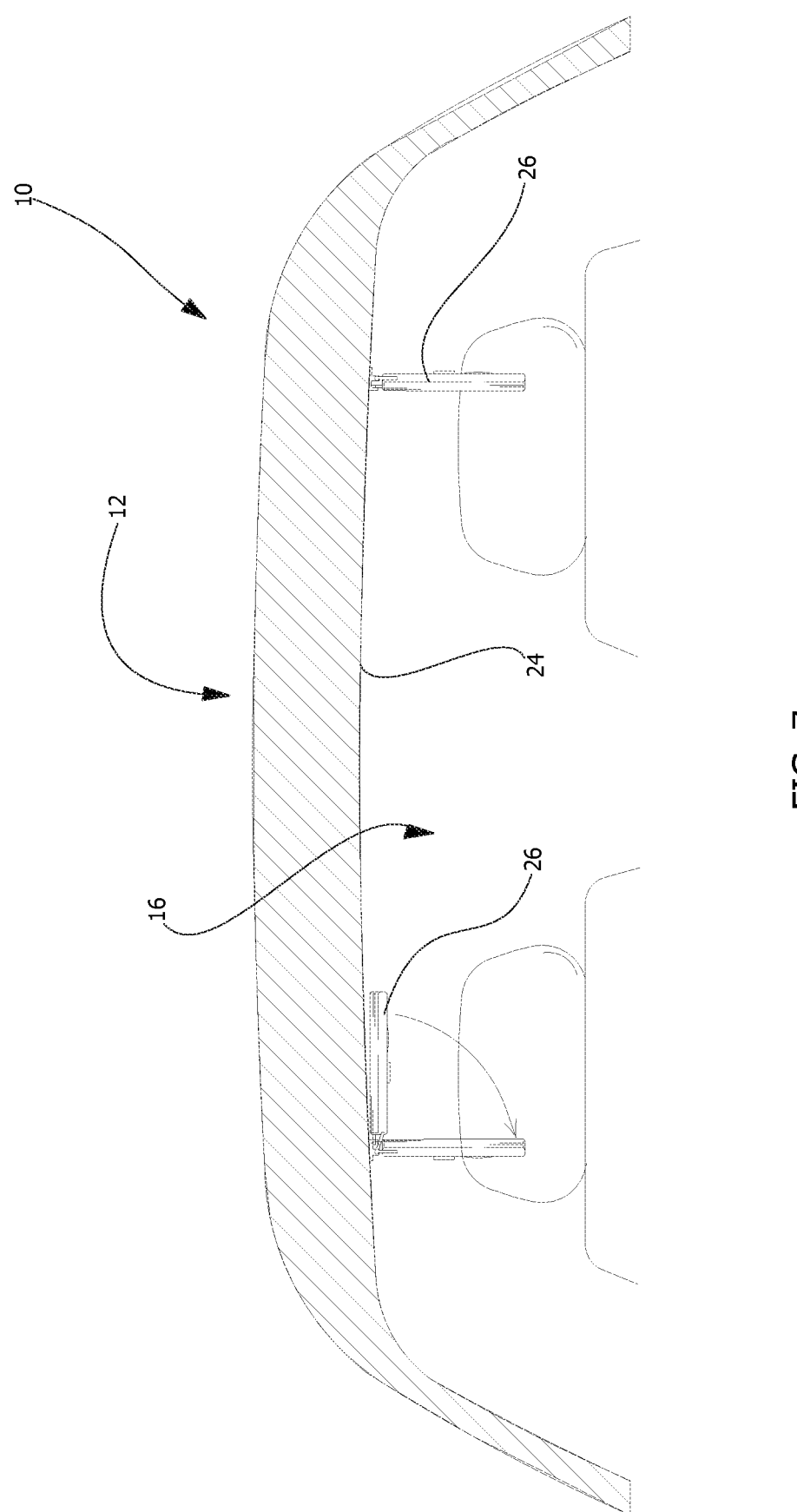
FIG. 7 is a cross-section view of an embodiment of the disclosure taken from Arrows 7-7 in FIG. 6.

With reference now to the drawings, and in particular to FIGS. 1 through 7 thereof, a new vehicle mounted mirror embodying the principles and concepts of an embodiment of the disclosure and generally designated by the reference numeral 10 will be described.

As best illustrated in FIGS. 1 through 7, the safety mirror assembly 10 generally comprises a vehicle 12 with a plurality of doors 14 for accessing an interior 16 of the vehicle 12. The plurality of doors 14 may include personal doors 18 for accessing seats in the interior 16 of the vehicle 12 and may include a hatch 20 for accessing a trunk or similar storage space in the vehicle 12. A visor 26 is mounted in a rear portion of the vehicle 12, which is defined as being a portion of the vehicle 12 positioned rearwardly of a driver seat of the vehicle 12. The visor 26 is positioned on an interior surface 24 of the vehicle 12 adjacent to one of the plurality of doors 14. The interior surface 24 may be a ceiling of the cabin, but also may be a surface of a seat of the vehicle 12, an inner side of a pillar of a frame of the vehicle 12, or an inner surface of the hatch 20.

The visor 26 has a first end 28 and a second end 30. The visor 26 has a first edge 32 and a second edge 34 each extending between the first end 28 and the second end 30. The visor 26 also has a first surface 36 and a second surface 38 each extending between the first end 28 and the second end 30 and between the first edge 32 and the second edge 34. The visor 26 is orientable such that the first surface 36 faces toward an opening 40 to the interior 16 of the vehicle 12 which is cover 54*ed* by the adjacent door 14 when the adjacent door 14 is closed.

A reflective material 42 is coupled to the first surface 36 of the visor 26 and is configured to reflect light which strikes the reflective material 42. The reflective material 42 is configured to facilitate a user 44 positioned outside the vehicle 12 proximate the adjacent door 14 to view behind the user 44 via the reflective material 42 when the first surface 36 of the visor 26 faces the opening 40.

A sound emitter 46 is mounted to the visor 26 and is configured to selectively emit an audible alarm. The sound emitter 46 is positioned on the first surface 36. A switch 48 is mounted to the visor 26 and is operatively coupled to the sound emitter 46.

A power supply 50 is electrically coupled to the switch 48. The power supply 50 comprises a battery 52, which is mounted in the visor 26. A cover 54 is coupled to the visor 26 and is movable to an open position with respect to an aperture 56 extending through the visor 26 to provide access to the battery 52.

A mount assembly 58 is coupled to the visor 26 and the vehicle 12 to mount the visor 26 to the vehicle 12. The mount assembly 58 comprises a base member 60 and an arm 62. The base member 60 is mounted to the interior surface 24 of the vehicle 12, and the arm 62 is coupled to the base member 60 and the visor 26. The arm 62 has an L-shape formed by a first portion 64 and a second portion 66 which are coupled to and oriented perpendicularly to each other. The first portion 64 is coupled to the base member 60, and the second portion 66 is coupled to the first end 28 of the visor 26 adjacent to the first edge 32 of the visor 26. The visor 26 is pivotable around a central axis of the second portion 66 extending from the first portion 64 of the arm 62 to the visor 26. A ball joint 68 is coupled to the base member 60 and the arm 62 to facilitate rotation of the arm 62 with respect to the base member 60 in a plurality of directions.

A locking member 70 is coupled to the vehicle 12 and the visor 26 to prevent a movement of the ball joint 68 of the mount assembly 58 when engaged. The locking member 70 comprises an insertion member 72 and a receiver 74 which are attachable to each other. The insertion member 72 is coupled to the first edge 32 of the visor 26 and spaced from the mount assembly 58. The receiver 74 is mounted to the interior surface 24 of the vehicle 12. The insertion member 72 has a cylindrical shape, and the receiver 74 defines a groove 76 which is complementary in shape to the insertion member 72. The insertion member 72 is receivable into the groove 76 to attach to the receiver 74 via a snap fit. The insertion member 72 is rotatable within the groove 76 and the visor 26 is pivotable around the central axis of the second portion 66 of the arm 62 when the insertion member 72 is attached to the receiver 74.

In use, the user 44 orients the visor 26 with respect to the vehicle 12 such that the user 44 can view behind the user 44 via the reflective material 42 when the user 44 is positioned outside of the vehicle 12 proximate to the adjacent door 14. For example, the visor 26 may be mounted adjacent to a rear passenger door 19, and the user 44 may use the visor 26 to view behind the user 44 while seating a child in a child seat. Alternatively, the visor 26 may be mounted adjacent to the hatch 20, and the user 44 may use the visor 26 to view behind the user 44 while placing items in the trunk. If the user 44 sees an individual 78 approaching the user 44 in an aggressive or threatening manner, the user 44 actuates the switch 48 to activate the sound emitter 46. The sound emitter 46 then sounds the audible alarm to alert others to the presence of the individual 78 and with the intention of warding off the individual 78.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A safety mirror assembly comprising:
a vehicle having a plurality of doors for accessing an interior of the vehicle;
a visor being mounted in a rear portion of the vehicle, the visor being positioned on an interior surface of the vehicle adjacent to one of the plurality of doors, the visor having a first end and a second end, the visor having a first edge and a second edge each extending between the first end and the second end, the visor having a first surface and a second surface each extending between the first end and the second end and between the first edge and the second edge, the visor being orientable such that the first surface faces an opening to the interior of the vehicle which is covered by the adjacent door when the adjacent door is closed;
a reflective material being coupled to the first surface of the visor and being configured to reflect light which strikes the reflective material, the reflective material being configured to facilitate a user positioned outside the vehicle proximate the adjacent door to view behind the user via the reflective material when the first surface of the visor faces the opening;
a sound emitter being mounted to the visor and being configured to selectively emit an audible alarm, the sound emitter being positioned on the first surface; and
a switch being mounted to the visor and being operatively coupled to the sound emitter.

2. The assembly of claim 1, further comprising a power supply being electrically coupled to the switch.

3. The assembly of claim 2, wherein the power supply comprises a battery.

4. The assembly of claim 3, wherein the battery is mounted in the visor.

5. The assembly of claim 4, further comprising a cover being coupled to the visor and being movable to an open position with respect to an aperture extending through the visor to provide access to the battery.

6. The assembly of claim 1, further comprising a mount assembly being coupled to the visor and the vehicle to mount the visor to the vehicle, the mount assembly comprising:

a base member being mounted to the interior surface of the vehicle; and an arm being coupled to the base member and the visor, the arm having an L-shape formed by a first portion and a second portion which are coupled to and oriented perpendicularly to each other, the first portion being coupled to the base member, the second portion being coupled to the first end of the visor adjacent to the first edge of the visor, the visor being pivotable around a central axis of the second portion extending from the first portion of the arm to the visor.

7. The assembly of claim 6, wherein the mount assembly further comprises a ball joint being coupled to the base member and the arm.

8. The assembly of claim 7, further comprising a locking member being coupled to the vehicle and the visor to prevent a movement of the ball joint of the mount assembly, the locking member comprising an insertion member and a receiver which are attachable to each other.

9. The assembly of claim 8, wherein the insertion member is coupled to the first edge of the visor and spaced from the mount assembly, the receiver being mounted to the interior surface of the vehicle, the insertion member having a cylindrical shape, the receiver defining a groove which is complementary in shape to the insertion member, the insertion member being receivable into the groove to attach to the receiver via a snap fit, the insertion member being rotatable within the groove and the visor being pivotable around the central axis of the second portion of the arm when the insertion member is attached to the receiver.

10. A safety mirror assembly comprising:

a vehicle having a plurality of doors for accessing an interior of the vehicle;

a visor being mounted in a rear portion of the vehicle, the visor being positioned on an interior surface of the vehicle adjacent to one of the plurality of doors, the visor having a first end and a second end, the visor having a first edge and a second edge each extending between the first end and the second end, the visor having a first surface and a second surface each extending between the first end and the second end and between the first edge and the second edge, the visor being orientable such that the first surface faces an opening to the interior of the vehicle which is covered by the adjacent door when the adjacent door is closed;

a reflective material being coupled to the first surface of the visor and being configured to reflect light which strikes the reflective material, the reflective material being configured to facilitate a user positioned outside the vehicle proximate the adjacent door to view behind the user via the reflective material when the first surface of the visor faces the opening;

a sound emitter being mounted to the visor and being configured to selectively emit an audible alarm, the sound emitter being positioned on the first surface;

a switch being mounted to the visor and being operatively coupled to the sound emitter;

a power supply being electrically coupled to the switch, the power supply comprising a battery, the battery being mounted in the visor;

a cover being coupled to the visor and being movable to an open position with respect to an aperture extending through the visor to provide access to the battery;

a mount assembly being coupled to the visor and the vehicle to mount the visor to the vehicle, the mount assembly comprising:

a base member being mounted to the interior surface of the vehicle;

an arm being coupled to the base member and the visor, the arm having an L-shape formed by a first portion and a second portion which are coupled to and oriented perpendicularly to each other, the first portion being coupled to the base member, the second portion being coupled to the first end of the visor adjacent to the first edge of the visor, the visor being pivotable around a central axis of the second portion extending from the first portion of the arm to the visor; and a ball joint being coupled to the base member and the arm; and a locking member being coupled to the vehicle and the visor to prevent a movement of the ball joint of the mount assembly, the locking member comprising an insertion member and a receiver which are attachable to each other, the insertion member being coupled to the first edge of the visor and spaced from the mount assembly, the receiver being mounted to the interior surface of the vehicle, the insertion member having a cylindrical shape, the receiver defining a groove which is complementary in shape to the insertion member, the insertion member being receivable into the groove to attach to the receiver via a snap fit, the insertion member being rotatable within the groove and the visor being pivotable around the central axis of the second portion of the arm when the insertion member is attached to the receiver.

* * * * *